United States Patent
Kim et al.

(10) Patent No.: US 11,576,200 B2
(45) Date of Patent: Feb. 7, 2023

(54) METHOD AND DEVICE FOR TRANSMITTING GRANT RELATED TO SIDELINK TRANSMISSION IN WIRELESS COMMUNICATION SYSTEM

(71) Applicant: LG ELECTRONICS INC., Seoul (KR)

(72) Inventors: Myoungseob Kim, Seoul (KR); Hanbyul Seo, Seoul (KR); Seungmin Lee, Seoul (KR); Hyukjin Chae, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/637,951

(22) PCT Filed: Aug. 10, 2018

(86) PCT No.: PCT/KR2018/009205
§ 371 (c)(1),
(2) Date: Feb. 10, 2020

(87) PCT Pub. No.: WO2019/031927
PCT Pub. Date: Feb. 14, 2019

(65) Prior Publication Data
US 2020/0178292 A1 Jun. 4, 2020

Related U.S. Application Data
(60) Provisional application No. 62/543,964, filed on Aug. 10, 2017.

(51) Int. Cl.
*H04W 72/14* (2009.01)
*H04B 7/14* (2006.01)
*H04W 72/04* (2009.01)

(52) U.S. Cl.
CPC .............. *H04W 72/14* (2013.01); *H04B 7/14* (2013.01); *H04W 72/042* (2013.01)

(58) Field of Classification Search
CPC ..... H04W 88/04; H04W 76/14; H04W 92/18; H04W 8/005
See application file for complete search history.

(56) References Cited

U.S. PATENT DOCUMENTS
2016/0338095 A1* 11/2016 Faurie ............... H04W 28/0278
2017/0094656 A1 3/2017 Chen et al.
(Continued)

FOREIGN PATENT DOCUMENTS
| KR | 20160104649 | 9/2016 |
| WO | 2016/0163509 | 10/2016 |
| WO | 2017/026970 | 2/2017 |

OTHER PUBLICATIONS
PCT International Application No. PCT/KR2018/009205, International Search Report dated Nov. 23, 2018, 3 pages.

*Primary Examiner* — Ayaz R Sheikh
*Assistant Examiner* — Debebe A Asefa
(74) *Attorney, Agent, or Firm* — Lee Hong Degerman Kang Waimey

(57) ABSTRACT

The present specification provides a method for transmitting a grant related to sidelink transmission of a remote UE, through a UE-to-network relay in a wireless communication system. A method performed by a relay UE comprises the steps of: receiving a first control message related to a grant from a serving base station, wherein the first control message includes an identifier for identifying a remote UE, first control information related to a time point of monitoring the grant, and second control information related to a time point at which the relay UE relays the grant to the remote UE; receiving the grant from the serving base station on the basis
(Continued)

of the first control information; and transmitting the grant to the remote UE on the basis of the identifier and the second control information.

8 Claims, 10 Drawing Sheets

(56) References Cited

U.S. PATENT DOCUMENTS

| | | | | |
|---|---|---|---|---|
| 2018/0098370 A1* | 4/2018 | Bangolae | ............... | H04W 88/04 |
| 2018/0206176 A1* | 7/2018 | Panteleev | ............. | H04W 76/14 |
| 2019/0327053 A1* | 10/2019 | Hu | ....................... | H04L 27/2613 |
| 2020/0163017 A1* | 5/2020 | Priyanto | ............... | H04W 88/04 |
| 2020/0195389 A1* | 6/2020 | Basu Mallick | ....... | H04W 72/02 |

* cited by examiner

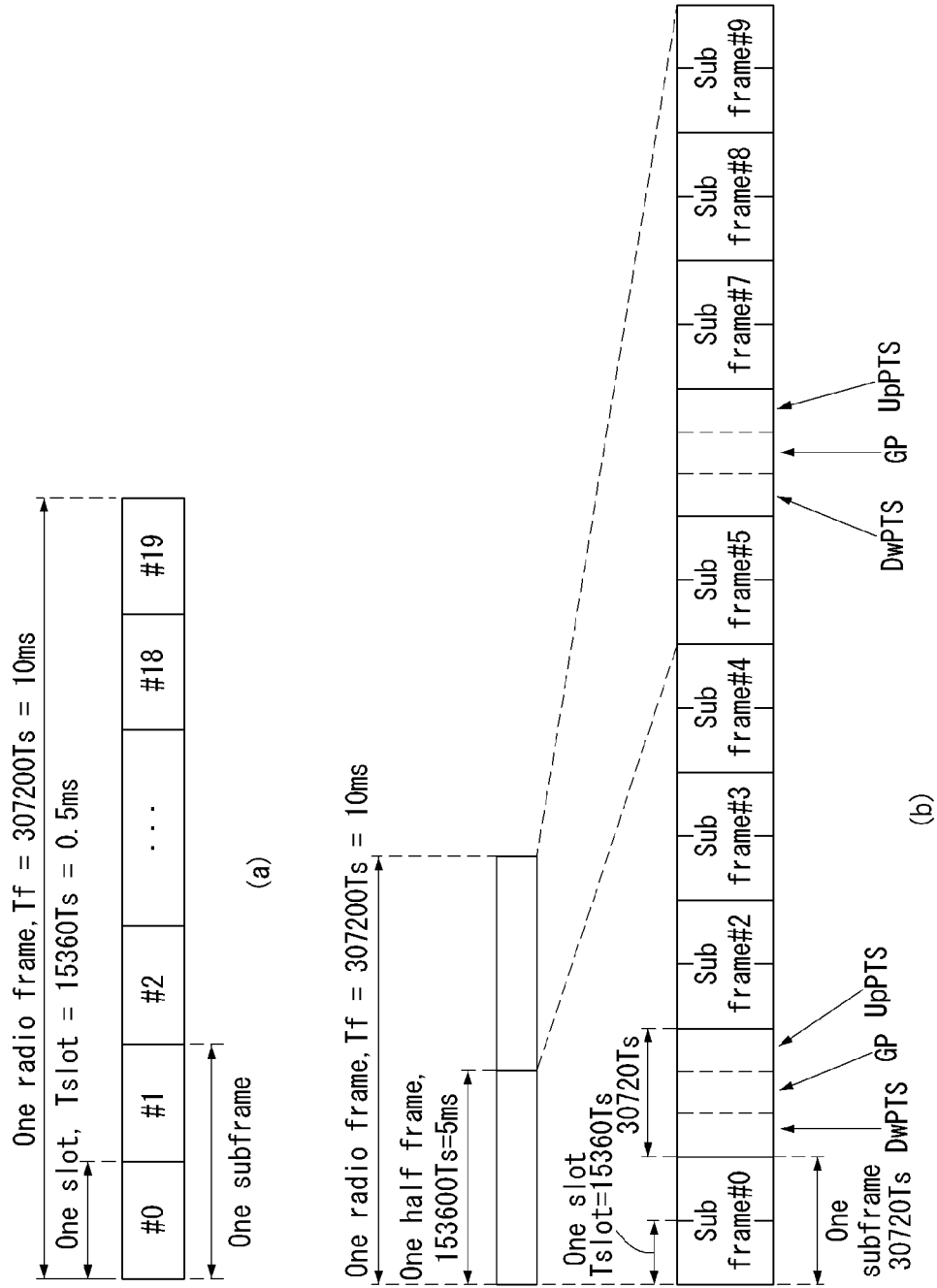
[FIG. 1]

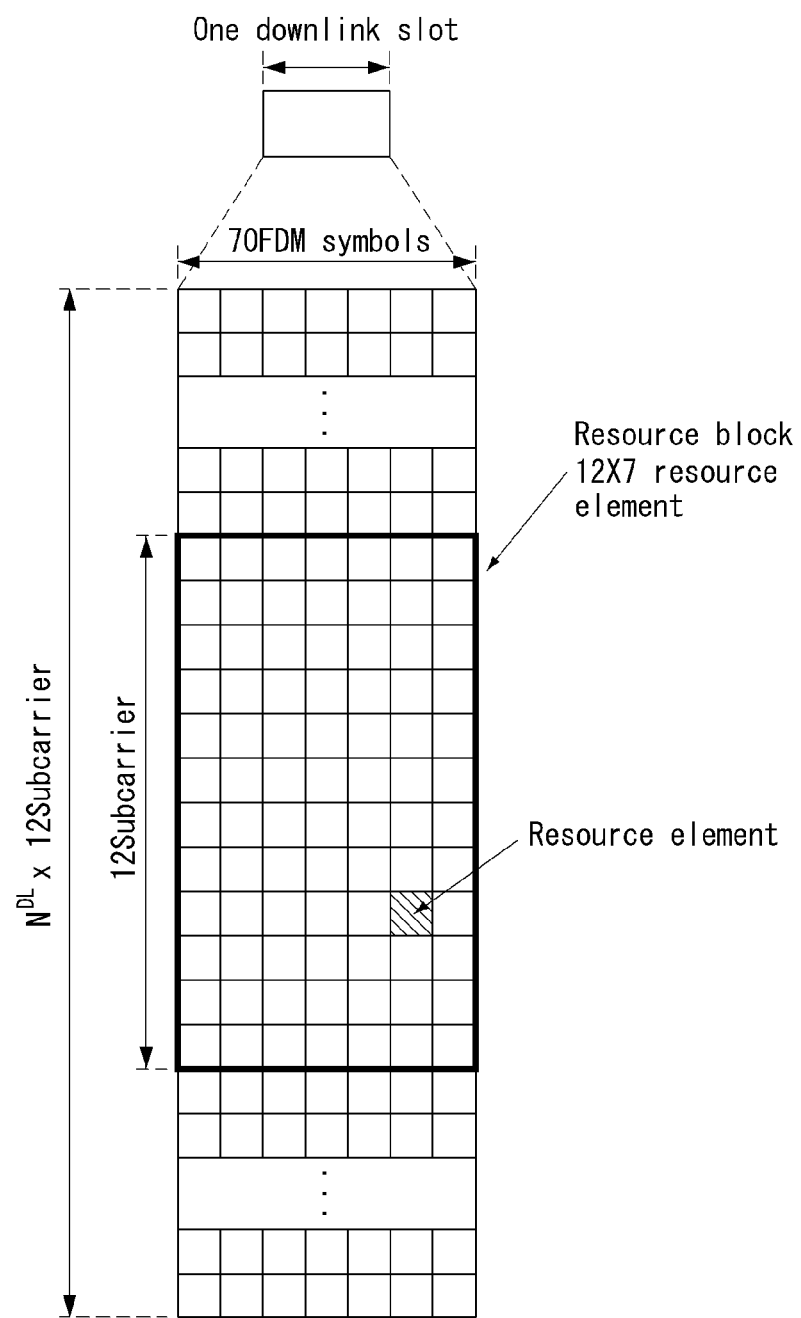

[FIG. 3]
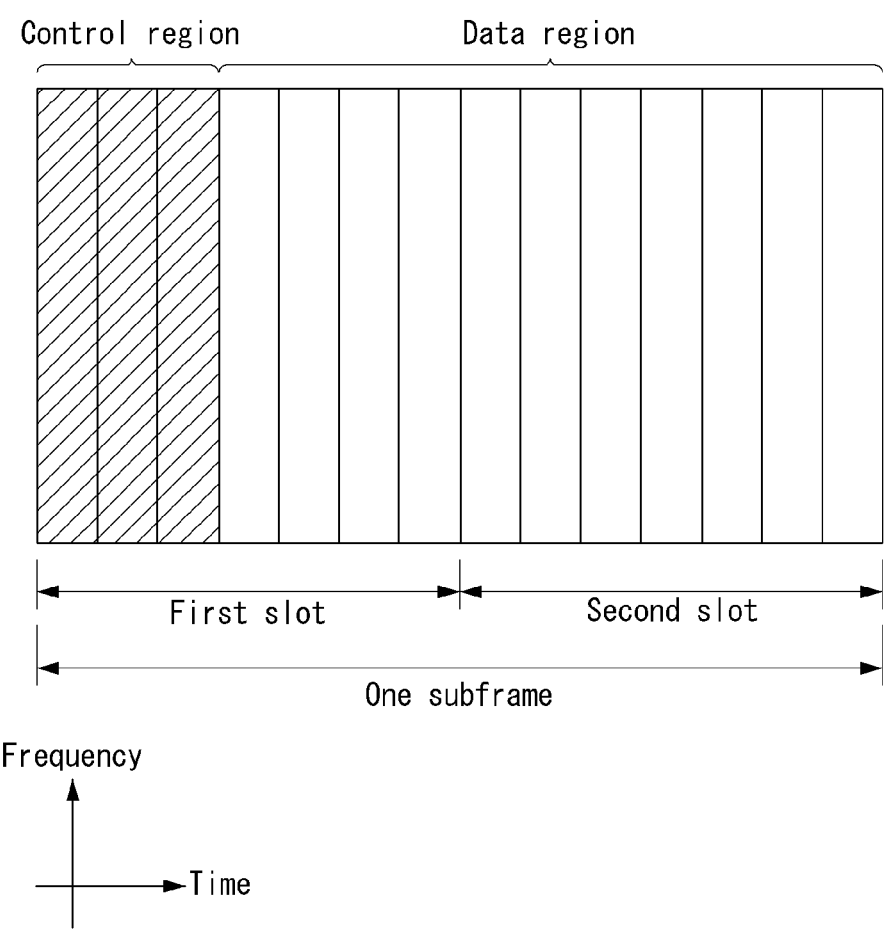

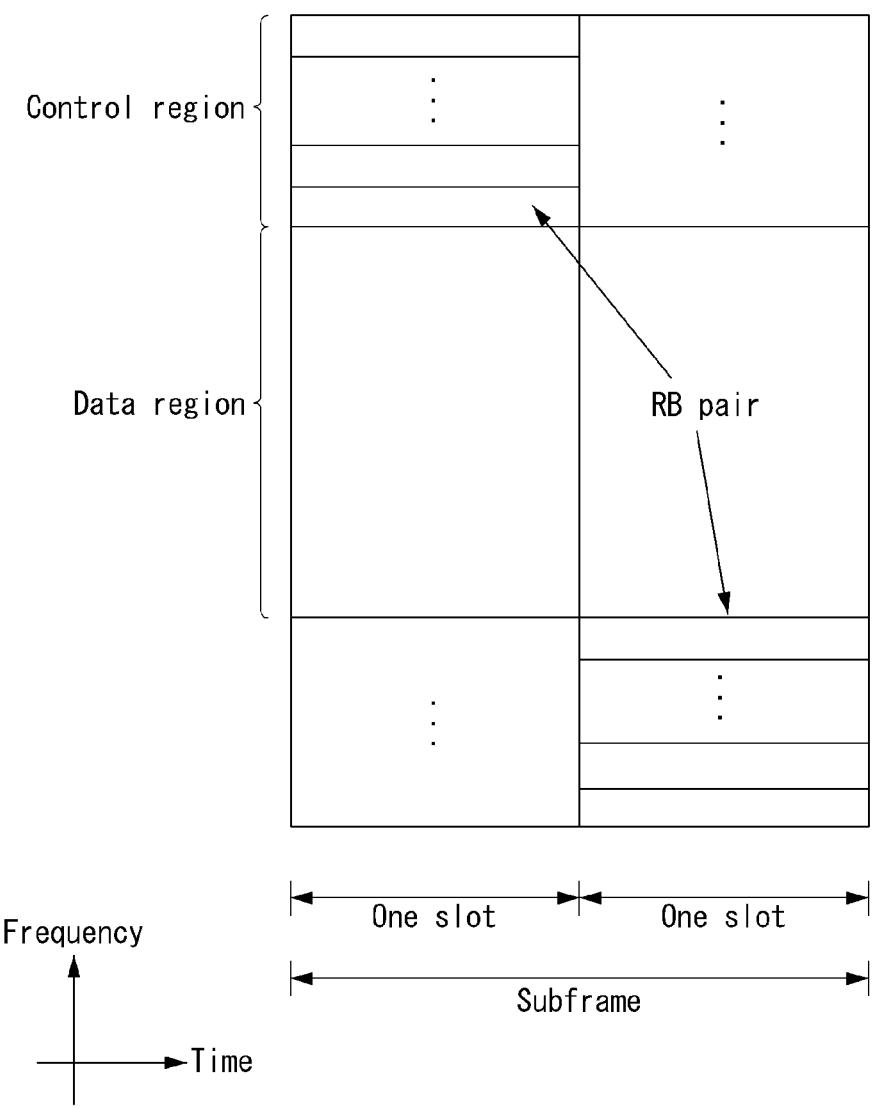
[FIG. 4]

【FIG. 5】
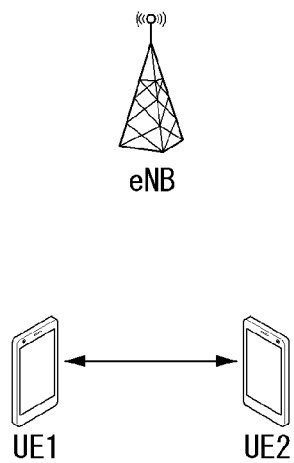
【FIG. 6】
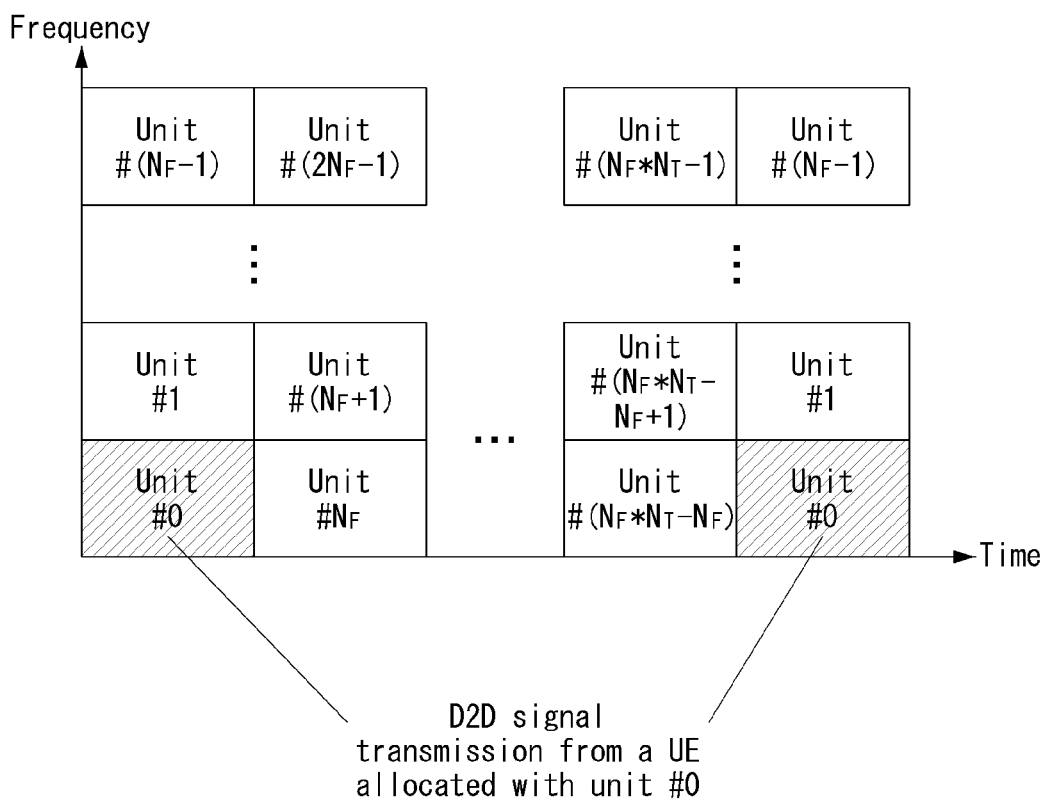

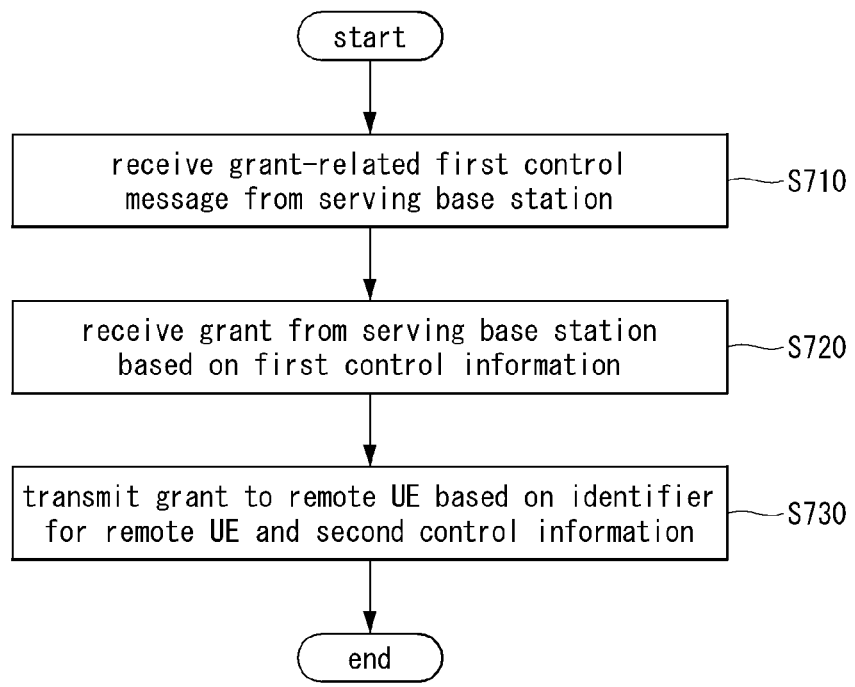
[FIG. 7]

[FIG. 8]
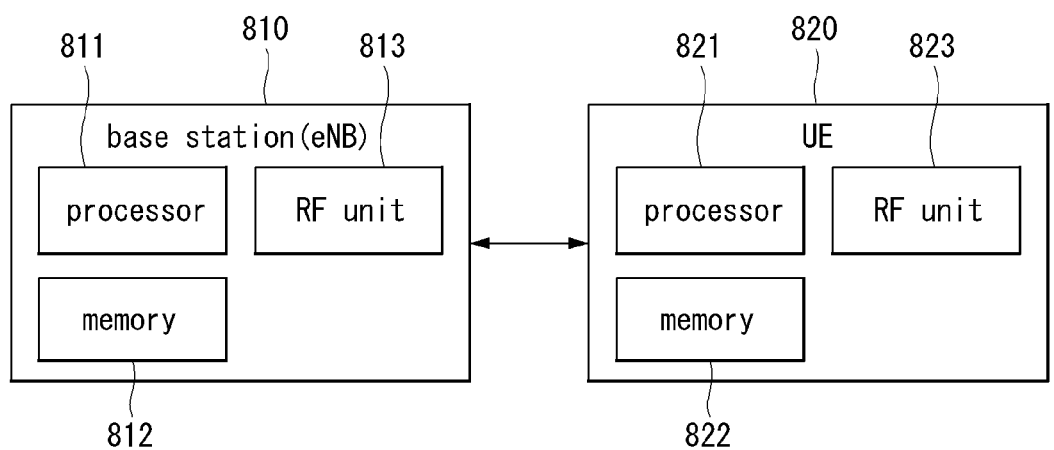

[FIG. 9]
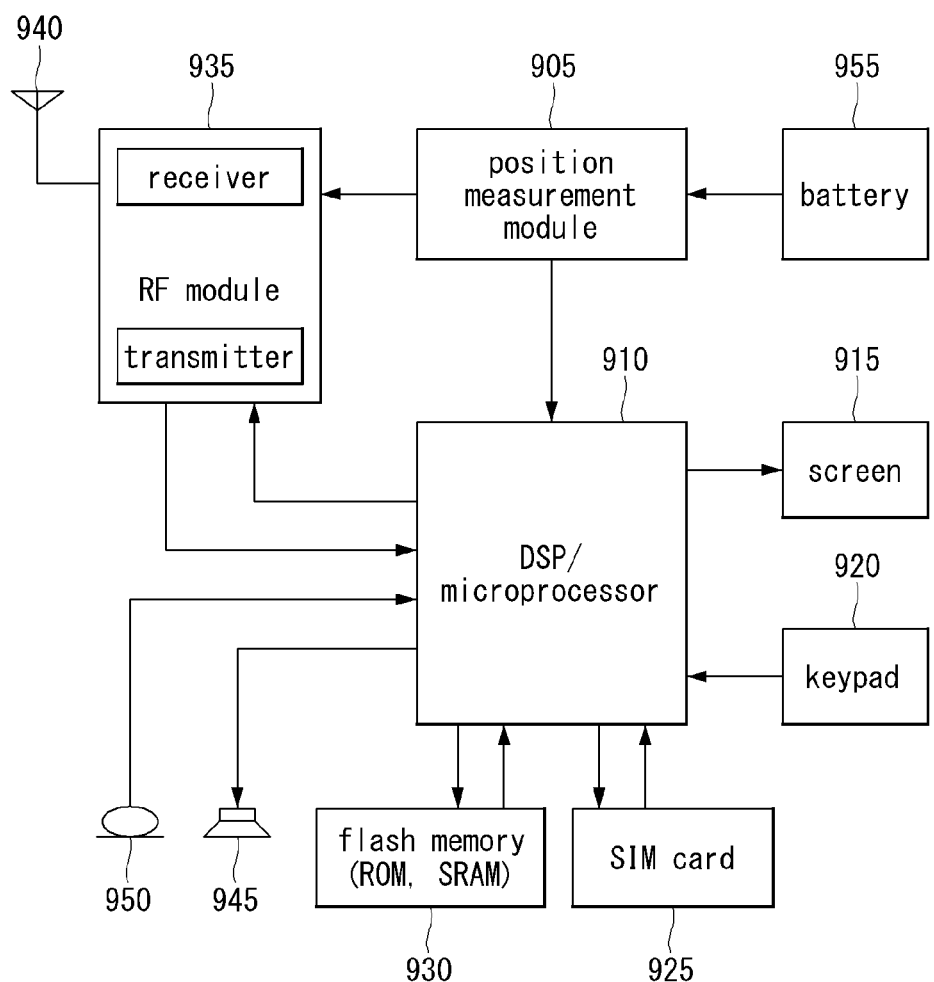

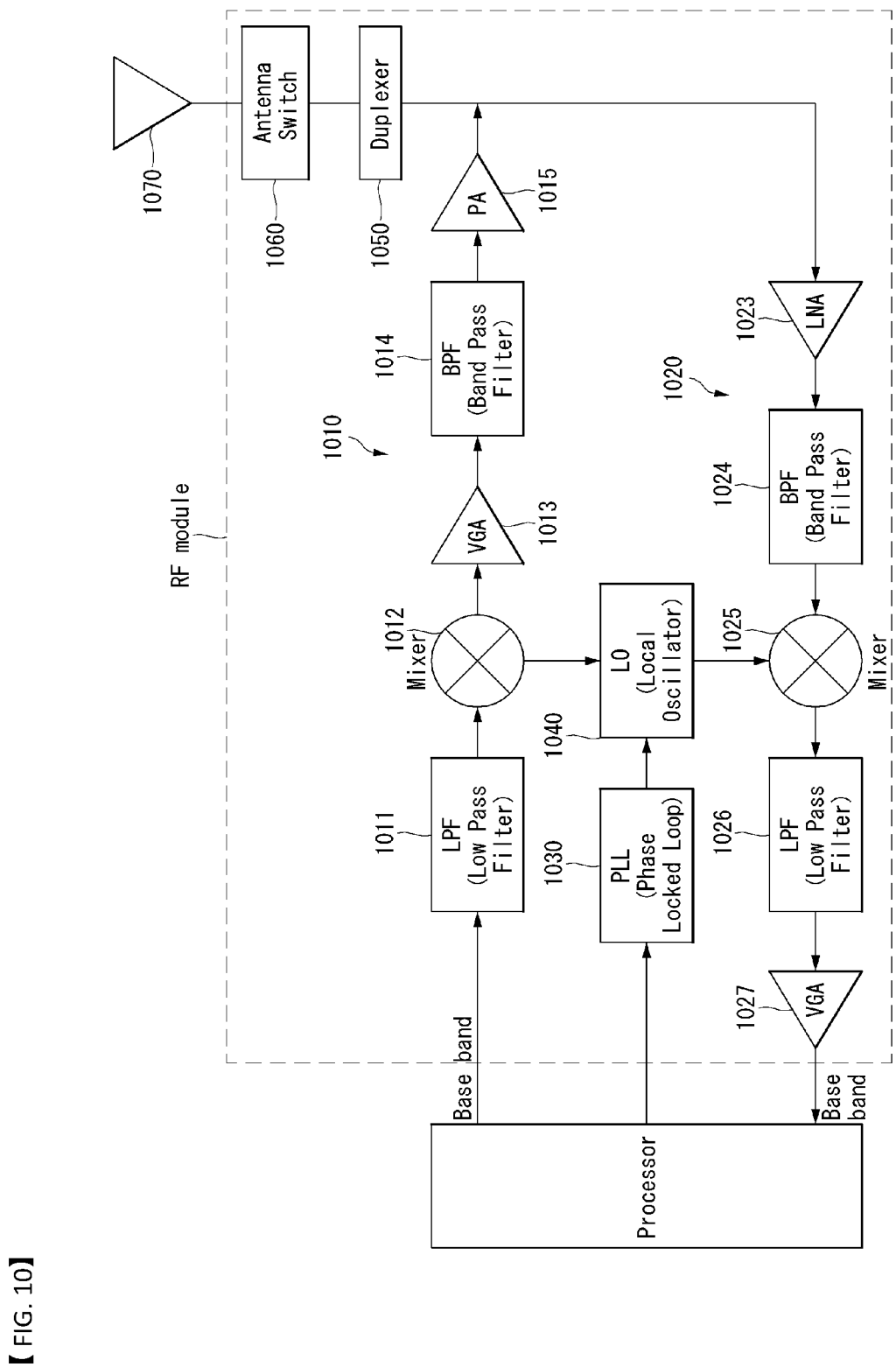
[FIG. 10]

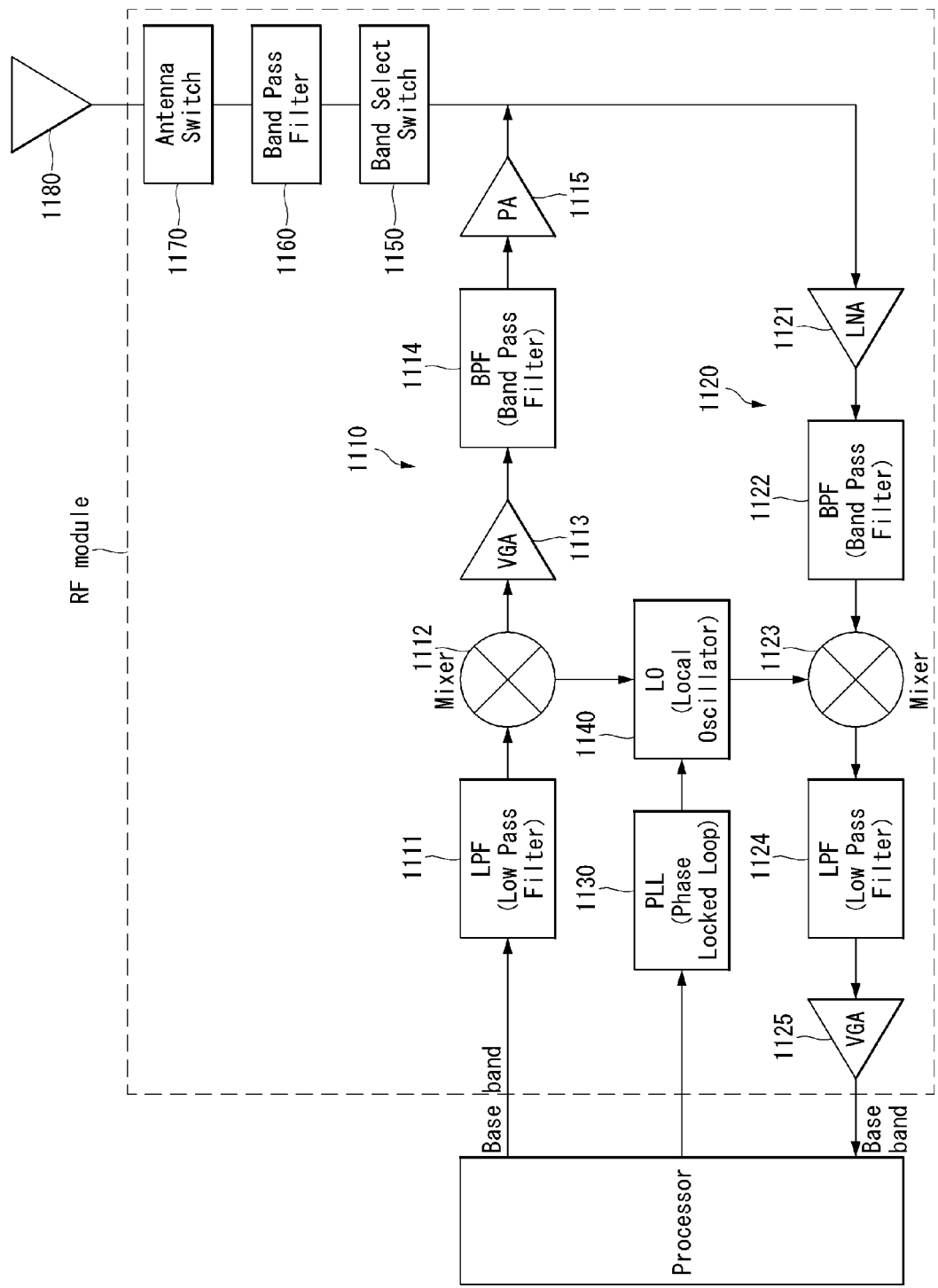
[FIG. 11]

METHOD AND DEVICE FOR TRANSMITTING GRANT RELATED TO SIDELINK TRANSMISSION IN WIRELESS COMMUNICATION SYSTEM

CROSS-REFERENCE TO RELATED APPLICATIONS

This application is the National Stage filing under 35 U.S.C. 371 of International Application No. PCT/KR2018/009205, filed on Aug. 10, 2018, which claims the benefit of U.S. Provisional Application No. 62/543,964, filed on Aug. 10, 2017, the contents of which are all hereby incorporated by reference herein in their entirety.

TECHNICAL FIELD

The disclosure relates to a wireless communication system, and more specifically, to a method for transmitting a grant related to sidelink transmission of a remote UE via a UE-to-network relay and a device for supporting the same.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DETAILED DESCRIPTION OF THE DISCLOSURE

Technical Problem

The disclosure aims to provide a method of transmitting/receiving a grant for scheduling sidelink transmission of a remote UE to the remote UE.

Objects of the present disclosure are not limited to the foregoing, and other unmentioned objects would be apparent to one of ordinary skill in the art from the following description.

Technical Solution

According to the disclosure, a method of transmitting a grant related to sidelink transmission of a remote UE via a UE-to-network relay in a wireless communication system is performed by a relay UE and comprises receiving a first control message related to the grant from a serving base station, the first control message including an identifier for identifying the remote UE, first control information related to a time of monitoring the grant, and second control information related to a time of relaying the grant to the remote UE, receiving the grant from the serving base station based on the first control information, and transmitting the grant to the remote UE based on the identifier and the second control information.

Further, according to the disclosure, the grant is received from the serving base station through a downlink control information (DCI) format.

Further, according to the disclosure, the DCI format is decoded based on a radio network temporary identifier (RNTI) associated with the grant.

Further, according to the disclosure, the first control information includes a periodicity of transmission of the grant and a subfeature offset where the transmission of the grant starts.

Further, according to the disclosure, the method further comprises transmitting, to the remote UE, a second control message related to a time of performing the sidelink transmission by the remote UE based on the grant.

Further, according to the disclosure, the second control message includes information indicating a time of receiving, by the relay UE, the grant from the serving base station and information indicating an offset from the time of reception.

Further, according to the disclosure, the second control message further includes an indicator indicating that the grant is scheduling information related to the sidelink transmission.

Further, according to the disclosure, the method further comprises receiving a buffer status report (BSR) related to the sidelink transmission from the remote UE and transmitting the received BSR to the serving base station.

Further, according to the disclosure, a relay UE transmitting a grant related to sidelink transmission of a remote UE via a UE-to-network relay in a wireless communication system comprises a radio frequency (RF) module for transmitting/receiving a radio signal and a processor functionally connected with the RF module, wherein the processor is configured to receive a first control message related to the grant from a serving base station, the first control message including an identifier for identifying the remote UE, first control information related to a time of monitoring the grant, and second control information related to a time of relaying the grant to the remote UE, receive the grant from the serving base station based on the first control information, and transmit the grant to the remote UE based on the identifier and the second control information.

Advantageous Effects

The disclosure may transmit/receive a grant related to sidelink transmission of a remote UE via a UE-to-network relay.

Effects of the present disclosure are not limited to the foregoing, and other unmentioned effects would be apparent to one of ordinary skill in the art from the following description.

BRIEF DESCRIPTION OF DRAWINGS

A more complete appreciation of the present disclosure and many of the attendant aspects thereof will be readily obtained as the same becomes better understood by reference to the following detailed description when considered in connection with the accompanying drawings, wherein:

FIG. 1 illustrates a structure of a radio frame in a wireless communication system to which the disclosure may apply;

FIG. 2 is a view illustrating an example resource grid for one downlink slot in a wireless communication system to which the disclosure may apply;

FIG. 3 illustrates a structure of a downlink subframe in a wireless communication system to which the disclosure may apply;

FIG. 4 illustrates a structure of an uplink subframe in a wireless communication system to which the disclosure may apply;

FIG. 5 is a view illustrating an element for a device-to-device (D2D) communication scheme;

FIG. 6 is a view illustrating an embodiment of configuring a resource unit;

FIG. 7 is a flowchart illustrating an example method of transmitting/receiving a grant related to sidelink transmission as proposed in the disclosure;

FIG. 8 is a block diagram illustrating a configuration of a wireless communication device to which methods proposed according to the disclosure are applicable;

FIG. 9 is a block diagram illustrating a configuration of a communication device according to an embodiment of the disclosure;

FIG. 10 is a view illustrating an example RF module of a wireless communication device to which a method proposed herein is applicable; and FIG. 11 is a view illustrating another example RF module of a wireless communication device to which a method proposed herein is applicable.

EMBODIMENTS OF THE DISCLOSURE

Hereinafter, preferred embodiments of the present invention will be described in detail with reference to the accompanying drawings. A detailed description to be disclosed below together with the accompanying drawing is to describe embodiments of the present invention and not to describe a unique embodiment for carrying out the present invention. The detailed description below includes details in order to provide a complete understanding. However, those skilled in the art know that the present invention can be carried out without the details.

In some cases, in order to prevent a concept of the present invention from being ambiguous, known structures and devices may be omitted or may be illustrated in a block diagram format based on core function of each structure and device.

In the specification, a base station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), a base transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the present invention and the use of the specific terms may be modified into other forms within the scope without departing from the technical spirit of the present invention.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as global system for mobile communications (GSM)/general packet radio service (GPRS)/enhanced data rates for GSM Evolution (EDGE). The OFDMA may be implemented as radio technology such as IEEE 802.11(Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

Further, 5G new radio (NR) defines enhanced mobile broadband (eMBB), massive machine type communications (mMTC), ultra-reliable and low latency communications (URLLC), and vehicle-to-everything (V2X) depending on usage scenarios.

The 5G NR standards are divided into standalone (SA) and non-standalone (NSA) depending on co-existence between the NR system and the LTE system.

5NR supports various subcarrier spacings and supports CP-OFDM on downlink and CP-OFDM and DFT-s-OFDM (SC-OFDM) on uplink.

The embodiments of the present invention may be based on standard documents disclosed in at least one of IEEE 802, 3GPP, and 3GPP2 which are the wireless access systems. That is, steps or parts which are not described to definitely show the technical spirit of the present invention among the embodiments of the present invention may be based on the documents. Further, all terms disclosed in the document may be described by the standard document.

3GPP LTE/LTE-A is primarily described for clear description, but technical features of the present invention are not limited thereto.

General System

FIG. 1 illustrates a structure a radio frame in a wireless communication system to which the present invention can be applied.

In 3GPP LTE/LTE-A, radio frame structure type 1 may be applied to frequency division duplex (FDD) and radio frame structure type 2 may be applied to time division duplex (TDD) are supported.

In FIG. 1, the size of the radio frame in the time domain is represented by a multiple of a time unit of $T\_s=1/(15000*2048)$. The downlink and uplink transmissions are composed of radio frames having intervals of $T f=307200*T\_s=10$ ms.

FIG. 1(a) illustrates the type 1 radio frame structure. The type 1 radio frame may be applied to both full duplex FDD and half duplex FDD.

The radio frame includes 10 subframes. One radio frame includes 20 slots each having a length of T_slot=15360*T_s=0.5 ms. Indices 0 to 19 are assigned to the respective slots. One subframe includes two contiguous slots in the time domain, and a subframe i includes a slot 2i and a slot 2i+1. The time taken to send one subframe is called a transmission time interval (TTI). For example, the length of one subframe may be 1 ms, and the length of one slot may be 0.5 ms.

In FDD, uplink transmission and downlink transmission are classified in the frequency domain. There is no restriction to full duplex FDD, whereas a UE is unable to perform transmission and reception at the same time in a half duplex FDD operation.

One slot includes a plurality of orthogonal frequency division multiplexing (OFDM) symbols in the time domain and includes a plurality of resource blocks (RBs) in the frequency domain. An OFDM symbol is for expressing one symbol period because 3GPP LTE uses OFDMA in downlink. The OFDM symbol may also be called an SC-FDMA symbol or a symbol period. The resource block is a resource allocation unit and includes a plurality of contiguous subcarriers in one slot.

FIG. 1(b) illustrates the type 2 radio frame structure. The type 2 radio frame structure includes 2 half frames each having a length of 153600*T_s=5 ms. Each of the half frames includes 5 subframes each having a length of 30720*T_s=1 ms.

In the type 2 radio frame structure of a TDD system, an uplink-downlink configuration is a rule showing how uplink and downlink are allocated (or reserved) with respect to all of subframes. Table 1 represents the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, "D" indicates a subframe for downlink transmission, "U" indicates a subframe for uplink transmission, and "S" indicates a special subframe including the three fields of a downlink pilot time slot (DwPTS), a guard period (GP), and an uplink pilot time slot (UpPTS) for each of the subframes of the radio frame.

The DwPTS is used for initial cell search, synchronization or channel estimation by a UE. The UpPTS is used for an eNB to perform channel estimation and for a UE to perform uplink transmission synchronization. The GP is an interval for removing interference occurring in uplink due to the multi-path delay of a downlink signal between uplink and downlink.

Each subframe i includes the slot 2i and the slot 2i+1 each having "T_slot=15360*T_s=0.5 ms."

The uplink-downlink configuration may be divided into seven types. The location and/or number of downlink subframes, special subframes, and uplink subframes are different in the seven types.

A point of time changed from downlink to uplink or a point of time changed from uplink to downlink is called a switching point. Switch-point periodicity means a cycle in which a form in which an uplink subframe and a downlink subframe switch is repeated in the same manner. The switch-point periodicity supports both 5 ms and 10 ms. In the case of a cycle of the 5 ms downlink-uplink switching point, the special subframe S is present in each half frame. In the case of the cycle of the 5 ms downlink-uplink switching point, the special subframe S is present only in the first half frame.

In all of the seven configurations, No. 0 and No. 5 subframes and DwPTSs are an interval for only downlink transmission. The UpPTSs, the subframes, and a subframe subsequent to the subframes are always an interval for uplink transmission.

Both an eNB and a UE may be aware of such uplink-downlink configurations as system information. The eNB may notify the UE of a change in the uplink-downlink allocation state of a radio frame by sending only the index of configuration information whenever uplink-downlink configuration information is changed. Furthermore, the configuration information is a kind of downlink control information. Like scheduling information, the configuration information may be transmitted through a physical downlink control channel (PDCCH) and may be transmitted to all of UEs within a cell in common through a broadcast channel as broadcast information.

Table 2 represents a configuration (i.e., the length of a DwPTS/GP/UpPTS) of the special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | — | — | — |
| 8 | 24144 · $T_s$ | | | — | — | — |

The structure of the radio frame according to the example of FIG. 1 is only one example. The number of subcarriers included in one radio frame, the number of slots included in one subframe, and the number of OFDM symbols included in one slot may be changed in various manners.

FIG. 2 is a diagram illustrating a resource grid for one downlink slot in the wireless communication system to which the present invention can be applied.

Referring to FIG. 2, one downlink slot includes the plurality of OFDM symbols in the time domain. Herein, it is exemplarily described that one downlink slot includes 7 OFDM symbols and one resource block includes 12 subcarriers in the frequency domain, but the present invention is not limited thereto.

Each element on the resource grid is referred to as a resource element and one resource block includes 12×7 resource elements. The number of resource blocks included in the downlink slot, NDL is subordinated to a downlink transmission bandwidth.

A structure of the uplink slot may be the same as that of the downlink slot.

FIG. 3 illustrates a structure of a downlink subframe in the wireless communication system to which the present invention can be applied.

Referring to FIG. 3, a maximum of three former OFDM symbols in the first slot of the sub frame is a control region to which control channels are allocated and residual OFDM symbols is a data region to which a physical downlink shared channel (PDSCH) is allocated. Examples of the downlink control channel used in the 3GPP LTE include a Physical Control Format Indicator Channel (PCFICH), a Physical Downlink Control Channel (PDCCH), a Physical Hybrid-ARQ Indicator Channel (PHICH), and the like.

The PFCICH is transmitted in the first OFDM symbol of the subframe and transports information on the number (that is, the size of the control region) of OFDM symbols used for transmitting the control channels in the subframe. The PHICH which is a response channel to the uplink transports an Acknowledgement (ACK)/Not-Acknowledgement (NACK) signal for a hybrid automatic repeat request (HARQ). Control information transmitted through a PDCCH is referred to as downlink control information (DCI). The downlink control information includes uplink resource allocation information, downlink resource allocation information, or an uplink transmission (Tx) power control command for a predetermined terminal group.

The PDCCH may transport A resource allocation and transmission format (also referred to as a downlink grant) of a downlink shared channel (DL-SCH), resource allocation information (also referred to as an uplink grant) of an uplink shared channel (UL-SCH), paging information in a paging channel (PCH), system information in the DL-SCH, resource allocation for an upper-layer control message such as a random access response transmitted in the PDSCH, an aggregate of transmission power control commands for individual terminals in the predetermined terminal group, a voice over IP (VoIP). A plurality of PDCCHs may be transmitted in the control region and the terminal may monitor the plurality of PDCCHs. The PDCCH is constituted by one or an aggregate of a plurality of continuous control channel elements (CCEs). The CCE is a logical allocation wise used to provide a coding rate depending on a state of a radio channel to the PDCCH. The CCEs correspond to a plurality of resource element groups. A format of the PDCCH and a bit number of usable PDCCH are determined according to an association between the number of CCEs and the coding rate provided by the CCEs.

The base station determines the PDCCH format according to the DCI to be transmitted and attaches the control information to a cyclic redundancy check (CRC) to the control information. The CRC is masked with a unique identifier (referred to as a radio network temporary identifier (RNTI)) according to an owner or a purpose of the PDCCH. In the case of a PDCCH for a specific terminal, the unique identifier of the terminal, for example, a cell-RNTI (C-RNTI) may be masked with the CRC. Alternatively, in the case of a PDCCH for the paging message, a paging indication identifier, for example, the CRC may be masked with a paging-RNTI (P-RNTI). In the case of a PDCCH for the system information, in more detail, a system information block (SIB), the CRC may be masked with a system information identifier, that is, a system information (SI)-RNTI. The CRC may be masked with a random access (RA)-RNTI in order to indicate the random access response which is a response to transmission of a random access preamble.

Enhanced PDCCH (EPDCCH) carries UE-specific signaling. The EPDCCH is located in a physical resource block (PRB) that is set to be terminal specific. In other words, as described above, the PDCCH may be transmitted in up to three OFDM symbols in the first slot in the subframe, but the EPDCCH may be transmitted in a resource region other than the PDCCH. The time (i.e., symbol) at which the EPDCCH in the subframe starts may be set in the UE through higher layer signaling (e.g., RRC signaling, etc.).

The EPDCCH is a transport format, a resource allocation and HARQ information associated with the DL-SCH and a transport format, a resource allocation and HARQ information associated with the UL-SCH, and resource allocation information associated with SL-SCH (Sidelink Shared Channel) and PSCCH Information, and so on. Multiple EPDCCHs may be supported and the terminal may monitor the set of EPCCHs.

The EPDCCH may be transmitted using one or more successive advanced CCEs (ECCEs), and the number of ECCEs per EPDCCH may be determined for each EPDCCH format.

Each ECCE may be composed of a plurality of enhanced resource element groups (EREGs). EREG is used to define the mapping of ECCE to RE. There are 16 EREGs per PRB pair. All REs are numbered from 0 to 15 in the order in which the frequency increases, except for the RE that carries the DMRS in each PRB pair.

The UE may monitor a plurality of EPDCCHs. For example, one or two EPDCCH sets may be set in one PRB pair in which the terminal monitors the EPDCCH transmission.

Different coding rates may be realized for the EPCCH by merging different numbers of ECCEs. The EPCCH may use localized transmission or distributed transmission, which may result in different mapping of the ECCE to the REs in the PRB.

FIG. 4 illustrates a structure of an uplink subframe in the wireless communication system to which the present invention can be applied.

Referring to FIG. 4, the uplink subframe may be divided into the control region and the data region in a frequency domain. A physical uplink control channel (PUCCH) transporting uplink control information is allocated to the control region. A physical uplink shared channel (PUSCH) transporting user data is allocated to the data region. One terminal does not simultaneously transmit the PUCCH and the PUSCH in order to maintain a single carrier characteristic.

A resource block (RB) pair in the subframe are allocated to the PUCCH for one terminal. RBs included in the RB pair occupy different subcarriers in two slots, respectively. The RB pair allocated to the PUCCH is frequency-hopped in a slot boundary.

D2D (Device-to-Device) Communication

FIG. 5 is a diagram for describing elements of a D2D (device-to-device) communication technique.

In FIG. 5, a UE means a terminal of a user, but when network equipment such as an eNB transmits and receives a signal according to a communication method with the UE, the corresponding network equipment may also be regarded as a kind of UE. Hereinafter, UE1 may operate to select a resource unit corresponding to a specific resource in a resource pool representing a set of resources and transmit a D2D signal using the corresponding resource unit. UE2, which is a receiving UE, configures a resource pool through which UE1 can transmit a signal, and detects a signal of UE1 within the corresponding pool. Here, the resource pool may be informed by the base station when UE1 is in the connection range of the base station, and may be determined by another UE or determined as a predetermined resource when it is outside the connection range of the base station. In general, a resource pool may include a plurality of resource units, and each UE may select one or a plurality of resource units to use for transmitting their D2D signals.

FIG. 6 is a diagram illustrating an embodiment of a configuration of a resource unit.

Referring to FIG. 6, a total frequency resource is divided into N_F and a total time resource is divided into N_T, so that the total number of N_F*N_T resource units may be defined. In this case, it can be expressed that the resource pool is repeated every N_T subframes. Specifically, one resource unit may be expressed periodically and repeatedly as shown in the figure. Alternatively, in order to obtain a diversity effect in a time or frequency dimension, an index of a physical resource unit to which one logical resource unit is mapped may change in a predetermined pattern according to time. In this resource unit structure, a resource pool may mean a set of resource units that can be used for transmission by a UE that intends to transmit a D2D signal.

The resource pool described above may be subdivided into several types. First, resource pools may be classified according to contents of D2D signals transmitted from each resource pool. As an example, the contents of the D2D signal may be classified as follows, and a separate resource pool may be configured, respectively.

Scheduling assignment (SA): A signal containing information such as a location of a resource for a transmission of a D2D data channel performed by each transmitting UE, a modulation and coding scheme (MCS), or MIMO transmission method, and/or timing advance required for demodulation of other data channels. This signal may be multiplexed and transmitted together with D2D data on the same resource unit, and the SA resource pool in the present disclosure may mean a pool of resources transmitted by multiplexing the SA with D2D data, and another name may be called a D2D control channel.

D2D data channel: A resource pool used by a transmitting UE to transmit user data using resources specified through SA. When it is possible to transmit multiplexed data with D2D data on the same resource unit, the resource pool for the D2D data channel may be a form in which only the D2D data channel having the form except for the SA information is transmitted. In other words, the resource elements used to transmit SA information on individual resource units in the SA resource pool may still be used to transmit D2D data in the D2D data channel resource pool.

Discovery channel: The resource pool for a message that allows a transmitting UE to transmit information, such as its ID, so that a neighboring UE can discover the transmitting UE itself.

Contrary to the above case, even when the content of the D2D signal is the same as each other, different resource pools may be used according to the transmission/reception attributes of the D2D signal. As an example, even in the same D2D data channel or discovery message, based on a transmission timing determination method of a D2D signal (for example, whether it is transmitted at the time of receiving a synchronization reference signal or is transmitted by applying a constant timing advance from the time) or a resource allocation method (for example, whether the eNB assigns transmission resources of an individual signal to an individual transmitting UE or whether an individual transmitting UE selects an individual signaling resource on its own within a pool), a signal format (for example, the number of symbol of each D2D signal occupies in one subframe, or the number of subframes used to transmit one D2D signal), signal strength from eNB, and transmit power strength of the D2D UE, it may be again divided into different resource pools.

In the present disclosure, for convenience of explanation, in D2D or V2V communication, a method in which eNB directly indicates transmission resources of D2D transmitting UE is called/defined as Mode 1 or Mode 3 and a method in which the transmission resource region is set in advance or the eNB assigns the transmission resource region and the UE directly selects the transmission resource is called/defined as Mode 2 or Mode 4. In case of D2D discovery, the case that the eNB directly indicates a resource is called/defined as Type 2 and the case that a UE directly selects a transmission resource in a predetermined resource region or a resource region indicated by the eNB is called/defined as Type 1.

The above-mentioned D2D may be called sidelink, and SA may be called as a physical sidelink control channel (PSCCH), a D2D synchronization signal may be called as a sidelink synchronization signal (SSS), and a control channel that transmits the most basic information before D2D communication and transmitted with SSS may be called a physical sidelink broadcast channel (PSBCH), or another name, a PD2DSCH (Physical D2D synchronization channel). A signal for notifying that a specific terminal is in the vicinity thereof, in which case the signal may include an ID of the specific terminal, and this channel may be called a physical sidelink discovery channel (PSDCH).

In Rel. 12 D2D, only the D2D communication UE transmits the PSBCH together with the SSS, and thus the measurement of the SSS is performed by using the DMRS of the PSBCH. The out-coverage UE measures the DMRS of the PSBCH and measures the reference signal RSRP (reference signal received power) of this DMRS to determine whether the UE itself is to be a synchronization source.

Described hereinafter is a method in which a network (e.g., an eNB, hereinafter denoted "eNB") transmits a sidelink grant to a remote UE as proposed in the disclosure.

The sidelink grant may mean downlink control information that is transmitted from the eNB to the UE for scheduling sidelink data.

In particular, the disclosure provides a method of transmitting the sidelink grant from the eNB to the remote UE when the remote UE and a relay UE are in different serving cells.

In other words, the disclosure provides a method in which the eNB transmits the sidelink grant to the remote UE in a network-assisted UE relay context and a method of indicating, to the relay UE and remote UEs, information related to, e.g., the time of transmission of relevant messages including the sidelink grant.

In a UE relaying (or relay) context, such as further enhancement D2D (FeD2D), the eNB may indicate (or transmit), to the UE, scheduling information (for sidelink data) in the form of a sidelink (SL) grant.

Here, the indication of the SL grant may be, e.g., D2D mode 1 or V2X mode 3.

D2D mode 1 or V2X mode 3 means a mode in which the eNB transmits a downlink grant to the UE.

Further, D2D mode 1 and V2X mode 3 may be represented as sidelink transmission mode 1 and sidelink transmission mode 3, respectively.

Hereinafter, for ease of description, the SL grant generated by the eNB for the relay UE is referred to as "L-grant," and the SL grant generated for the remote UE is referred to as "M-grant."

The relay UE and the remote UE may be in the same cell, or the remote UE may be in a different serving cell from the serving cell where the relay UE belongs.

In this case, scheduling information (in particular, information for the resource the remote UE transmits to the relay UE) for the remote UE may not be directly indicated in the serving cell of the remote UE or the serving cell of the relay UE.

Thus, a relay UE-assisted method may be used to address the issues.

A method of transmitting a sidelink grant to an enb to a relay UE as proposed in the disclosure may largely include: (i) the step of transmitting, by the serving cell of the relay UE, an M-grant to the relay UE; and (ii) the step of transmitting, by the relay UE, the M-grant to the remote UE.

First, the method of transmitting, by the relay UE, the M-grant to the relay UE is described.

For ease of description, the serving cell of the relay UE is denoted 'serving cell 1.'

Here, (1) to (3) below may be considered when serving cell 1 transmits the M-grant to the relay UE.

(1) Target Remote UE Information Indication

For example, serving cell 1 may signal an identifier for the remote UE to which the M-grant is to be transmitted, i.e., the ID of the remote UE, so as to notify the relay UE of what remote UE the M-grant to be transmitted is for.

Here, the signaling information (e.g., remote UE ID) may be directly transmitted (or transferred) to the relay UE via, e.g., downlink control information (DCI).

However, if the signaling information is contained in size-limited DCI, an overhead may occur.

If the number of remote UEs connectable to the relay UE is limited, information for the remote UE(s) may be previously defined.

Whenever a new remote UE is discovered (or added), the information (the information for the remote UE(s)) may be updated.

At this time, the DCI transmitted to the relay UE may have a limited size indicating the remote UE and may include fields made up with bits.

What remote UEs the individual states (or individual bits) of the fields indicate may be signaled to the UE via, e.g., RRC signaling or higher layer signaling.

(2) Type of Transmission of M-Grant

The eNB may signal the M-grant (or transmission of the relevant information) to the relay UE in the following forms.

Embedded in the physical downlink shared channel (PDSCH) in the form of higher layer information (e.g., MAC CE)

signaling in DCI format

In this case, the eNB may additionally signal, to the relay UE, radio network temporary identifier (RNTI) information (and remote UE ID information associated with the RNTI value) that is to be used for (blind) decoding of the DCI format (associated with the M-grant).

Here, the RNTI information may differ from the RNTI information that is to be used for (blind) decoding the DCI format associated with the L-grant.

In particular, the timing offset information associated with the M-grant may be transmitted to the relay UE via a higher layer message, such as medium access control control element (MAC CE) or RRC, or system information block (SIB) message.

As such, the information transmitted to the relay UE may also be transmitted via a separate channel (e.g., physical sidelink control channel (PSCCH) or physical sidelink shared channel (PSSCH)) and, in particular, the information may be transmitted, embedded in the M-grant to be relayed.

(3) M-Grant (Transmission) Monitoring and Relay Time

The time of monitoring of the M-grant by the relay UE is described.

In order to minimize an increase in computation and power consumption due to M-grant monitoring by the relay UE, the time (e.g., period or subframe offset) of monitoring of the M-grant by the relay UE or the search space may be previously set by the network or may interoperate with the ID of the remote UE.

For example, the M-grant transmitted in subfeature # n may be for remote UE # A, and the M-grant transmitted in subfeature # m may be for remote UE # B.

Such a rule may be pre-defined or may be signaled to the relay UE via higher layer signal.

Next, the time of relaying the M-grant by the relay UE is described.

The eNB may provide the relay UE with information (e.g., an offset value or range from the time of reception of the M-grant) for the time of relaying the M-grant (to the relay UE).

As the eNB indicates the time of relaying of the M-grant to the relay UE, the relay UE may coordinate the wireless area network (WAN) uplink transmission (UL Tx) time and the SL (M-grant relay) Tx time.

To do so may mitigate collision between the WAN UL Tx and the SL Tx which may occur in the relay UE.

The WAN UL Tx may mean transmission, by the relay UE, of a UL signal to the base station.

Or, the eNB may provide the relay UE with information (an offset value or range from the time of reception of the M-grant) for the time of completion of the remote UE's M-grant-based SL Tx and enable the relay UE to transfer the M-grant to the remote UE, considering the time budget required for (SL Tx) transmission processing, reception of (M-grant) by the remote UE, and transmission of relaying (M-grant) message.

The above content may be set based on implementation of the relay UE.

Or, the time of relaying of the M-grant by the relay UE may be (previously) defined implicitly.

For example, if the relay UE receives the M-grant in subfeature (SF) # n, the relay UE may relay the M-grant in the first (available) SL SF after SF # (n+4).

If the remote UE receives information for the time (e.g., SF # n) of reception of the M-grant by the relay UE (from the relay UE), the remote UE may be implicitly aware of the time (e.g., SF # (n+4)) of relaying of the M-grant.

Of course, additional information needs to be (implicitly or explicitly) signaled for the remote UE to be aware of the time of performing the SL Tx associated with the M-grant.

Where all of the above-described methods may not apply, the remote UE needs to steadily monitor when the M-grant is to be relayed.

However, if the remote UE is able to know the eNB's time of transmission of the M-grant, the remote UE needs to monitor the M-grant after the eNB's time of transmission of the M-grant.

Next, a method of transmitting, by the relay UE, the M-grant to the remote UE is described.

(1) and (2) as follows may be considered when the relay UE relays the M-grant received from the serving cell to the remote UE(s).

(1) Time of M-grant-based sidelink transmission (SL Tx)

The relay UE may (explicitly) transfer some information, as follows, to the remote UE in relation to the time of M-grant-based SL Tx.

Information for the relay UE's M-grant reception time and offset information (signaled by the base station) from the reception time Offset information with respect to the time of reception of the M-grant from the relay UE This information may be transmitted via a separate resource (or channel), or the information may be transmitted, embedded in some fields inside the M-grant.

Or, the time of the remote UE's M-grant-based SL TX may be implicitly defined (previously).

The offsets from the time of reception of the M-grant by the relay UE to the time of relaying the M-grant by the relay UE and the time of performing the M-grant-based SL TX may be implicitly defined (previously).

For example, if the relay UE receives the M-grant in SF # n, the relay UE may relay the M-grant in the first (available) SL SF after SF # (n+4).

Further, (associated) remote UE(s) may perform the associated SL Tx operation in the first SL SF after SF # (n+8).

The offset from the time of reception of the M-grant by the relay UE to the time of performing the M-grant-based SL TX may be implicitly defined (previously).

For example, if the remote UE receives the M-grant in SF # (n+4), the remote UE may perform the associated SL Tx operation in the first SL SF after SF # (n+8).

(2) Channel (or Resource) Used when the Relay UE Relays the M-Grant (or Transmits Associated Information) to the Remote UE Use of PSCCH (or PSSCH) (new for the purposes)

Required is an indicator (additionally, a relevant remote UE ID) indicating (M-grant-based) remote UE Tx-related scheduling information on the channel for the purpose.

For example, the indicator may be intended for differentiating from the relay UE SL Tx-related PSCCH.

The above-described M-grant-based SL Tx time-related information may be included in the channel for the purpose.

For example, the channel-related reference signal sequence for the (M-grant relay) purpose and scrambling (ID (initialization value) used as input parameter when generated) may be set to differ from those of the common (for the remote UE) SL Tx of the relay UE.

As the reference signal sequence, a pseudo-random sequence may be used.

Next, a method of reconfiguring the resource amount is briefly described.

The following assistance information may be transferred to the relay UE (or eNB) for the relay UE to determine the amount of transmission resources allocated to the remote UE when the M-grant is generated.

Remote UE may provide buffer status report (BSR) information to relay UE.

Further, the relay UE may relay the received BSR information to the serving cell.

Relay UE may observe the remote UE's utilization of resources and calculate the resource amount (or BSR information) (via implementation) needed for the remote UE and report it to the serving cell.

FIG. 7 is a flowchart illustrating an example method of transmitting/receiving a grant related to sidelink transmission as proposed in the disclosure.

Specifically, FIG. 7 illustrates a method of transmitting/receiving a grant related to sidelink transmission of a remote UE via UE-to-network relay, which is performed by a relay UE.

First, the relay UE receives a first control message related to the grant from the serving base station (S710).

The first control message includes at least one of an identifier for identifying the remote UE, first control information related to the time of monitoring of the grant, or second control information related to the time of relaying, by the relay UE, the grant to the remote UE.

The grant may be received from the serving base station via a downlink control information (DCI) format.

In this case, the DCI format may be decoded based on a radio network temporary identifier (RNTI) associated with the grant.

Further, the first control information may include at least one of the periodicity of transmission of the grant or the subfeature offset at which the transmission of the grant starts.

The relay UE receives the grant from the serving base station based on the first control information (S720).

The relay UE transmits the grant to the remote UE based on the identifier and the second control information (S730).

Additionally, the relay UE may transmit, to the remote UE, a second control message related to the time of sidelink transmission of the remote UE based on the grant. The operation may be performed before or after step S710.

The second control message may include at least one of information indicating the time of reception, by the relay UE, of the grant from the serving base station or information indicating the offset from the time of reception.

The second control message may further include an indicator indicating that the grant is scheduling information related to the sidelink transmission.

Additionally, in order for the serving base station to determine the transmission resource allocation amount of the remote UE, the relay UE may receive a buffer status report (BSR) related to the sidelink transmission from the remote UE and may transmit the received BSR to the serving base station.

Devices to which the Present Disclosure May Apply

FIG. 8 is a block diagram illustrating a configuration of a wireless communication device to which methods proposed according to the disclosure are applicable.

Referring to FIG. 8, a wireless communication system includes a base station 810 and a plurality of UEs 820 positioned in the coverage of the base station.

The base station 810 includes a processor 811, a memory 812, and a radio frequency (RF) unit 813. The processor 811 implements the functions, processes or steps, and/or methods proposed above in connection with FIGS. 1 to 7.

Wireless interface protocol layers may be implemented by the processor. The memory 812 is connected with the processor and stores various pieces of information for driving the processor. The RF unit 813 is connected with the processor to transmit and/or receive wireless signals.

The RF unit may be referred to as an RF module as well.

The UE 820 includes a processor 821, a memory 822, and an RF module (or unit) 823.

The processor implements the functions, processes or steps, and/or methods proposed above in connection with FIGS. 1 to 7. Wireless interface protocol layers may be implemented by the processor. The memory 822 is connected with the processor and stores various pieces of information for driving the processor. The RF unit is connected with the processor and transmits and/or receives wireless signals.

The memory 812 and 822 may be positioned inside or outside the processor 811 and 821 and be connected with the processor 1411 and 1421 via various known means.

The base station and/or the UE may include a single or multiple antennas.

FIG. 9 is a block diagram illustrating a configuration of a communication device according to an embodiment of the disclosure.

In particular, FIG. 9 illustrates in greater detail the UE of FIG. 8.

Referring to FIG. 9, the UE may include a processor (or a digital signal processor (DSP)) 910, an RF module (or RF unit) 935, a power management module 905, an antenna 940, a battery 955, a display 915, a keypad 920, a memory 930, a subscriber identification module (SIM) card 925 (which is optional), a speaker 945, and a microphone 950. The UE may include a single or multiple antennas.

The processor 910 implements the functions, processes or steps, and/or methods proposed above in connection with FIGS. 1 to 7. Wireless interface protocol layers may be implemented by the processor.

The memory 930 is connected with the processor to store information related to the operation of the processor. The memory may be positioned inside or outside the processor and be connected with the processor via various known means.

For example, the user inputs instruction information, e.g., a phone number, by voice activation using the microphone 950 or by pressing (or touching) a button of the keypad 920. The processor 910 receives the instruction information and handles performing a proper function, e.g., calling at the phone number. Operational data may be extracted from the SIM card 925 or the memory 930. Further, the processor 910 may display the instruction information or operational information on the display 915 for convenience or user's recognition.

The RF module 935 is connected with the processor 910 to transmit and/or receive RF signals. The processor 910 transfers instruction information to the RF module 935 to initiate communication, e.g., to transmit a wireless signal constituting voice communication data. The RF module 935 includes a receiver and a transmitter for receiving and transmitting wireless signals. The antenna 940 functions to transmit and receive wireless signals. Upon receiving a wireless signal, the RF module 935 transfers the signal for processing by the processor 910 and convert the signal into a base-band signal. The processed signal may be converted into readable or audible information output via the speaker 945.

FIG. 10 is a view illustrating an example RF module of a wireless communication device to which a method proposed herein is applicable.

Specifically, FIG. 10 illustrates an example RF module that may be implemented in a frequency division duplex (FDD) system.

First, in a transmission path, the processor described above in connection with FIGS. 8 and 9 processes data to be transmitted and provides an analog output signal to a transmitter 1010.

In the transmitter 1010, the analog output signal is filtered by a low pass filter (LPF) 1011 for removing images caused by digital-to-analog conversion (ADC), up-converted from baseband to RF by an up-converter (e.g., Mixer) 1012, and amplified by a variable gain amplifier (VGA) 1013. The amplified signal is filtered by a filter 1014, further amplified by a power amplifier (PA) 1015, routed via duplexer(s) 1050/antenna switch(es) 1060, and transmitted via an antenna 1070.

In a reception path, the antenna 1070 receives signals from the outside and provides the received signals. The signals are routed via the antenna switch(es) 1060/duplexers 1050 and are provided to a receiver 1020.

In the receiver 1020, the received signals are amplified by a low noise amplifier (LNA) 1023, filtered by a band pass filter 1024, and down-converted from RF to baseband by a down-converter (e.g., a mixer) 1025.

The down-converted signals are filtered by a low pass filter (LPF) 1026 and amplified by a VGA 1027 so that an analog input signal is obtained. The obtained analog input signal is provided to the processor described above in connection with FIGS. 8 and 9.

A local oscillator (LO) generator 1040 generates transmission and reception LO signals and provides them to the up-converter 1012 and the down-converter 1025, respectively.

A phase locked loop (PLL) 1030 receives control signals from the processor to generate transmission and reception LO signals at proper frequencies and provide the control signals to the LO generator 1040.

The circuits shown in FIG. 10 may have a different arrangement than that shown in FIG. 10.

FIG. 11 is a view illustrating another example RF module of a wireless communication device to which a method proposed herein is applicable.

Specifically, FIG. 11 illustrates an example RF module that may be implemented in a time division duplex (TDD) system.

In the TDD system, the transceiver 1110 and receiver 1120 of the RF module are identical in structure to the transceiver and receiver of the RF module in the FDD system.

The following description of the RF module of the TDD system focuses primarily on differences from the RF module of the FDD system, and the description in connection with FIG. 10 may apply to the same structure.

The signal amplified by the power amplifier (PA) 1115 of the transmitter is routed via the band select switch 1550, the band pass filter (BPF) 1160, and antenna switch(es) 1170 and is transmitted via the antenna 1680.

In a reception path, the antenna 1180 receives signals from the outside and provides the received signals. The signals are routed via the antenna switch(es) 1170, band pass filter 1160, and band select switch 1150 and are provided to the receiver 1120.

The above-described embodiments regard predetermined combinations of the components and features of the disclosure. Each component or feature should be considered as optional unless explicitly mentioned otherwise. Each component or feature may be practiced in such a manner as not to be combined with other components or features. Further, some components and/or features may be combined together to configure an embodiment of the disclosure. The order of the operations described in connection with the embodiments of the disclosure may be varied. Some components or features in an embodiment may be included in another embodiment or may be replaced with corresponding components or features of the other embodiment. It is obvious that the claims may be combined to constitute an embodiment unless explicitly stated otherwise or such combinations may be added in new claims by an amendment after filing.

The embodiments of the disclosure may be implemented by various means, e.g., hardware, firmware, software, or a combination thereof. When implemented in hardware, an embodiment of the disclosure may be implemented with, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, an embodiment of the disclosure may be implemented as a module, procedure, or function performing the above-described functions or operations. The software code may be stored in a memory and driven by a processor. The memory may be positioned inside or outside the processor to exchange data with the processor by various known means.

It is apparent to one of ordinary skill in the art that the disclosure may be embodied in other specific forms without departing from the essential features of the disclosure. Thus, the above description should be interpreted not as limiting in all aspects but as exemplary. The scope of the present disclosure should be determined by reasonable interpretations of the appended claims and all equivalents of the present disclosure belong to the scope of the present disclosure.

INDUSTRIAL AVAILABILITY

Although the methods of transmitting a grant related to sidelink transmission in a wireless communication system have been described in connection with examples in which they apply to 3GPP LTE/LTE-A systems, and 5G systems, the methods are also applicable to other various wireless communication systems.

The invention claimed is:

1. A method of transmitting a grant, by a first UE, in a wireless communication system, the method comprising:

receiving, from a base station, a first control message related to the grant, receiving the grant from the base station based on the first control information;

transmitting, on a specific channel for transmitting the grant to a second UE, the grant to the second UE; and transmitting, to the second UE, a second control message related to a time of performing the sidelink transmission by the second UE based on the grant, wherein a reference signal sequence related to the specific channel is differently configured from a reference signal sequence related to a channel for transmitting sidelink data to the second UE, wherein the first control message is received from the base station through a downlink control information (DCI) format, wherein the DCI format includes a field for the identifier, wherein information on a mapping between (i) values of the field and (ii) second UEs related to the grant is transmitted to the first UE through a Radio Resource Control (RRC) signaling, wherein each value of the field represents a respective one of the second UEs related to the grant, wherein the second UE is determined based on the value of the field and (ii) the information on the mapping, wherein the first UE and the second UE are in different cells, and wherein the second control message includes information on a time of receiving, by the first UE, the grant from the base station, information on an offset from the time of reception and information on the grant scheduling information related to the sidelink transmission.

2. The method of claim 1, wherein the DCI format is decoded based on a radio network temporary identifier (RNTI) associated with the grant.

3. The method of claim 1, wherein the first control information includes a periodicity of transmission of the grant and a subfeature offset where the transmission of the grant starts.

4. The method of claim 1, further comprising:

receiving a buffer status report (BSR) related to the sidelink transmission of the second UE from the second UE; and transmitting the received BSR to the base station.

5. The method of claim 1, wherein the first control message includes (i) an identifier for identifying the second UE, (ii) first control information related to a time of monitoring the grant, and (iii) second control information related to a time of relaying the grant to the second UE.

6. The method of claim 5, wherein receiving the grant from the base station based on the first control message includes receiving the grant from the base station based on the first control information.

7. The method of claim 5, wherein transmitting, on a specific channel for transmitting the grant to the second UE, the grant to the second UE includes transmitting, on a specific channel for transmitting the grant to the second UE, the grant to the second UE based on the identifier and the second control information.

8. A first UE transmitting a grant in a wireless communication system, the first UE comprising:

a radio frequency (RF) module including a transceiver for transmitting/receiving a radio signal; and a processor functionally connected with the RF module, wherein the processor is configured to receive, from a base station, a first control message related to the grant, receive the grant from the base station based on the first control information;

transmit, on a specific channel for transmitting the grant to the second UE, the grant to the second UE; and transmit, to the second UE, a second control message related to a time of performing the sidelink transmission by the second UE based on the grant, wherein a reference signal sequence related to the specific channel is differently configured from a reference signal sequence related to a channel for transmitting sidelink data to the second UE, wherein the first control message is received from the base station through a downlink control information (DCI) format, wherein the DCI format includes a field for the identifier, wherein information on a mapping between (i) values of the field and (ii) second UEs related to the grant is transmitted to the first UE through a Radio Resource Control (RRC) signaling, wherein each value of the field represents a respective one of the second UEs related to the grant, wherein the second UE is determined based on the value of the field and (ii) the information on the mapping, wherein the first UE and the second UE are in different cells, and wherein the second control message includes information on a time of receiving, by the first UE, the grant from the base station, information on an offset from the time of reception and an information on the grant scheduling information related to the sidelink transmission.

* * * * *